United States Patent
Kawamura et al.

(10) Patent No.: US 11,903,897 B2
(45) Date of Patent: Feb. 20, 2024

(54) WALKING SUPPORT SYSTEM

(71) Applicant: TOYOTA JIDOSHA KABUSHIKI KAISHA, Aichi-ken (JP)

(72) Inventors: Hiroaki Kawamura, Nagoya (JP); Kohei Shintani, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 168 days.

(21) Appl. No.: 17/686,423

(22) Filed: Mar. 4, 2022

(65) Prior Publication Data
US 2022/0370282 A1 Nov. 24, 2022

(30) Foreign Application Priority Data
May 6, 2021 (JP) .................. 2021-078305

(51) Int. Cl.
*A61H 3/06* (2006.01)

(52) U.S. Cl.
CPC .............. *A61H 3/061* (2013.01); *A61H 3/068* (2013.01); *A61H 2003/063* (2013.01); *A61H 2201/5007* (2013.01); *A61H 2201/5048* (2013.01); *A61H 2201/5097* (2013.01)

(58) Field of Classification Search
CPC ...................................................... A61H 3/061
See application file for complete search history.

(56) References Cited

U.S. PATENT DOCUMENTS

| | | | | |
|---|---|---|---|---|
| 5,973,618 A * | 10/1999 | Ellis | .......... | G01S 13/88 342/24 |
| 7,267,281 B2 * | 9/2007 | Hopkins | .......... | A61H 3/061 434/112 |
| 7,336,226 B2 * | 2/2008 | Jung | .......... | A61H 3/061 342/357.52 |
| 9,508,269 B2 * | 11/2016 | Slamka | .......... | G01C 21/20 |
| 10,304,355 B2 * | 5/2019 | Guo | .......... | G09B 21/006 |
| 10,639,228 B1 * | 5/2020 | Tavares | .......... | G08B 21/02 |
| 11,475,762 B2 * | 10/2022 | Shintani | .......... | A61H 3/068 |
| 11,607,362 B2 * | 3/2023 | Kawamura | .......... | G06V 20/20 |
| 11,672,724 B2 * | 6/2023 | Kawamura | .......... | G06V 10/82 340/944 |
| 2008/0123902 A1 * | 5/2008 | Park | .......... | G06V 20/588 382/104 |
| 2009/0032590 A1 * | 2/2009 | Hopkins | .......... | A61H 3/061 235/385 |
| 2009/0132158 A1 * | 5/2009 | Sironi | .......... | G01S 13/76 701/532 |
| 2013/0332018 A1 * | 12/2013 | Kim | .......... | G05D 1/0261 701/25 |
| 2019/0307632 A1 | 10/2019 | Yashiro et al. | | |

FOREIGN PATENT DOCUMENTS

WO    2018025531 A1    2/2018

* cited by examiner

*Primary Examiner* — Noah Chandler Hawk
(74) *Attorney, Agent, or Firm* — HAUPTMAN HAM, LLP

(57) ABSTRACT

When a frontmost white line of a crosswalk cannot be detected due to an obstacle existing on the crosswalk, an edge position of the obstacle closer to a pedestrian in an image acquired by a camera is set as the frontmost white line of the crosswalk. As a result, a vibration generation device vibrates in a pattern that urges the pedestrian to stop at the time when the pedestrian reaches a position before the edge position of the obstacle closer to the pedestrian, so that a stop notification for walking can be appropriately performed to the pedestrian even when the obstacle exists on the crosswalk.

5 Claims, 12 Drawing Sheets

WALKING SUPPORT SYSTEM

CROSS-REFERENCE TO RELATED APPLICATION

This application claims priority to Japanese Patent Application No. 2021-078305 filed on May 6, 2021, incorporated herein by reference in its entirety.

BACKGROUND

1. Technical Field

The present disclosure relates to a walking support system. In particular, the present disclosure relates to an improvement in a system that performs a stop notification to a pedestrian such as a visually impaired person before a crosswalk.

2. Description of Related Art

A system disclosed in Re-publication of PCT International Publication No. 2018-025531 (WO 2018-025531) is known as a system (walking support system) that performs various notifications (for example, a stop notification before a crosswalk) to a pedestrian such as a visually impaired person so that the pedestrian can cross the crosswalk safely. WO 2018-025531 discloses a technique including a direction determination unit that determines the direction in which a person who acts without using vision (a visually impaired person) walks and a guide information generation unit that generates guide information for guiding the visually impaired person to walk in the determined direction. In the technique, the walking direction of the visually impaired person is determined by matching an image from a camera carried by the visually impaired person and a reference image stored in advance to guide the visually impaired person with the walking direction by voice or the like.

In a situation where a pedestrian (visually impaired person) actually approaches a crosswalk, the position where the pedestrian should stop when a traffic light (for example, a pedestrian traffic light) is a red light is a position before the crosswalk (for example, a few meters before the crosswalk). Therefore, when a stop notification is performed to the pedestrian before the crosswalk, it is necessary to accurately recognize the position of a frontmost white line of the crosswalk (white line closest to the pedestrian) with information from an image acquisition unit such as a camera. The walking support system disclosed in WO 2018-025531 outputs a voice message notifying that the visually impaired person is at the position before the crosswalk when he/she approaches the crosswalk, based on an image from the camera.

SUMMARY

However, there are cases where an obstacle (for example, a vehicle parked on the street) exists on the crosswalk and a situation where the obstacle covers the frontmost white line of the crosswalk (for example, a situation where, although the existence of the crosswalk is recognized, the frontmost white line is covered so that the position of the white line cannot be accurately recognized) occurs. When such a situation occurs, it is conceivable to perform, for example, a stop notification for walking to the pedestrian at the time when the obstacle is recognized for the sake of safety. However, this may cause the pedestrian to stop at a position before the crosswalk more than necessary, which leads to a concern that a different obstacle may get in between the pedestrian and the crosswalk or the like, making it difficult to walk when resuming walking. Therefore, there is room for improvement in implementing the walking support system.

The present disclosure has been made in view of the above points, and an object of the present disclosure is to provide a walking support system that can appropriately perform a stop notification for walking to a pedestrian even when an obstacle exists on a crosswalk.

A solution of the present disclosure for achieving the above object is premised on a walking support system that is able to perform a stop notification to a pedestrian before a crosswalk in a situation where the pedestrian approaches the crosswalk. The walking support system includes an image acquisition unit, a crosswalk detection unit, a notification unit, and an edge position setting unit. The image acquisition unit acquires an image in front of the pedestrian who is walking. The crosswalk detection unit is able to recognize the crosswalk based on the image acquired by the image acquisition unit and is able to detect an edge position of the crosswalk closer to the pedestrian. The notification unit performs the stop notification for urging the pedestrian to stop when the pedestrian reaches a position before the edge position of the crosswalk closer to the pedestrian, the edge position having been detected by the crosswalk detection unit. The edge position setting unit sets an edge position of an obstacle closer to the pedestrian in the image acquired by the image acquisition unit as the edge position of the crosswalk closer to the pedestrian, when the crosswalk detection unit fails to detect the edge position of the crosswalk closer to the pedestrian due to the obstacle existing on the crosswalk.

Due to this specific matter, in a situation where the obstacle does not exist on the crosswalk and the crosswalk detection unit detects the edge position of the crosswalk closer to the pedestrian based on the image acquired by the image acquisition unit (including the situation where, even when the obstacle exists on the crosswalk, the edge position of the crosswalk closer to the pedestrian can be detected from the image acquired by the image acquisition unit), the notification unit performs the notification (stop notification) urging the pedestrian to stop at the time when the pedestrian reaches the position before the edge position of the crosswalk closer to the pedestrian. However, in the situation where the obstacle exists on the crosswalk and the edge position of the crosswalk closer to the pedestrian cannot be detected from the image acquired by the image acquisition unit due to the obstacle, the edge position setting unit sets the edge position of the obstacle closer to the pedestrian in the image as the edge position of the crosswalk closer to the pedestrian (the edge position setting unit performs a process of regarding the edge position of the obstacle closer to the pedestrian as the edge position of the crosswalk closer to the pedestrian). As a result, the notification unit performs the stop notification to the pedestrian at the time when the pedestrian reaches the position before the edge position of the obstacle closer to the pedestrian. Therefore, it is possible to appropriately perform the stop notification to the pedestrian even when the obstacle exists on the crosswalk.

Further, the edge position setting unit sets the edge position of the obstacle closer to the pedestrian in the image as the edge position of the crosswalk closer to the pedestrian when a value obtained by subtracting an obstacle gap distance from a crosswalk gap distance is larger than a preset value, the crosswalk gap distance being a distance between a lower end position of the image acquired by the image acquisition unit and a lower end position of the crosswalk in the image, the crosswalk having been recognized by the image, and the obstacle gap distance being a distance between the lower end position of the image and a lower end position of the obstacle in the image, the obstacle having been recognized by the image.

Generally, in a crosswalk, a plurality of white lines extending in a direction orthogonal to the crossing direction is arranged at predetermined intervals in the crossing direction. The situation where the obstacle exists on the crosswalk includes a situation where the entire white line closest to the pedestrian is covered by the obstacle, and a situation where a part of the white line closest to the pedestrian is covered by the obstacle.

In the situation where the entire white line closest to the pedestrian is covered by the obstacle, white lines located behind the white line closest to the pedestrian (on the side farther from the pedestrian) may be able to be detected. Thus, the value obtained by subtracting the obstacle gap distance (the distance between the lower end position of the image and the lower end position of the obstacle in the image, the obstacle having been recognized by the image) from the crosswalk gap distance (the distance between the lower end position of the image and the lower end position of the crosswalk in the image, the crosswalk having been recognized by the image; in this case the distance between the lower end position of the image and the lower end position of the white line located on the back side) is a relatively large value. In this case, the edge position of the obstacle closer to the pedestrian in the image acquired by the image acquisition unit is set as the edge position of the crosswalk closer to the pedestrian, and the notification unit performs the stop notification to the pedestrian at the time when the pedestrian reaches the position before the edge position of the obstacle closer to the pedestrian (the position regarded as the edge position of the crosswalk closer to the pedestrian).

On the other hand, in the situation where a part of the white line closest to the pedestrian is covered by the obstacle, the crosswalk detection unit can detect the part of the white line as the edge position closer to the pedestrian, so that the value obtained by subtracting the obstacle gap distance from the crosswalk gap distance is a relatively small value (including the case of a negative value). In this case, by using the edge position of the actual crosswalk closer to the pedestrian (the edge position of the white line closest to the pedestrian) that has been detected by the crosswalk detection unit without using the edge position of the obstacle closer to the pedestrian in the image acquired by the image acquisition unit, the notification unit performs the stop notification to the pedestrian at the time when the pedestrian reaches the position before this edge position closer to the pedestrian.

In this way, by selecting the edge position to be adopted in performing the stop notification (the edge position of the crosswalk closer to the pedestrian or the edge position of the obstacle closer to the pedestrian) based on the value obtained by subtracting the obstacle gap distance from the crosswalk gap distance, the stop notification to the pedestrian can be appropriately performed.

The walking support system also includes a system stop unit that stops the walking support system and transmits information on a stop of the walking support system to the notification unit when a state where the crosswalk detection unit does not recognize the crosswalk continues for a predetermined time.

In addition to the above-mentioned situations, the situation where the obstacle exists on the crosswalk includes a situation where the entire crosswalk is covered by the obstacle (most or all of the white lines of the crosswalk are covered by the obstacle) in the image acquired by the image acquisition unit. In such a situation, the existence of the crosswalk cannot be recognized (whether the crosswalk exists cannot be determined) from the image acquired by the image acquisition unit. That is, there is a possibility that a stop notification (stop notification due to the existence of the obstacle) is performed even though the crosswalk does not exist, and the reliability of the operation of the walking support system (reliability of the stop notification) cannot be obtained sufficiently. Therefore, in such a situation, the state where the crosswalk is not recognized continues for a predetermined time, so that the system is stopped on condition that the crosswalk is not recognized for the predetermined time to avoid performing an erroneous stop notification. In addition to the above, information that the system has stopped is transmitted to the notification unit, and the notification unit informs the pedestrian that the system has stopped. As a result, it is possible to suppress the malfunction of the system in the situation where the entire crosswalk is covered by the obstacle, and it is also possible to notify the pedestrian that the system has stopped.

Further, when the image acquisition unit, the crosswalk detection unit, the notification unit, and the edge position setting unit are built in a white cane used by a visually impaired person, the walking support system can be realized only with the white cane, and thus a highly practical walking support system can be provided.

Further, the notification unit is configured to perform a notification to the visually impaired person by vibration or voice.

As a result, the stop notification can be appropriately performed to the visually impaired person (the pedestrian) who walks while holding the white cane.

In the present disclosure, when the edge position of the crosswalk closer to the pedestrian cannot be detected due to the obstacle existing on the crosswalk, the edge position of the obstacle closer to the pedestrian in the image acquired by the image acquisition unit is set as the edge position of the crosswalk closer to the pedestrian. As a result, the notification unit performs the stop notification to the pedestrian at the time when the pedestrian reaches the position before the edge position of the obstacle closer to the pedestrian, and even when an obstacle exists on the crosswalk, the stop notification can be appropriately performed to the pedestrian.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. The present embodiment describes a case where a walking support system according to the present disclosure is built in a white cane used by a visually impaired person. Pedestrians in the present disclosure are not limited to visually impaired persons.

Schematic Configuration of White Cane

Figure 1:
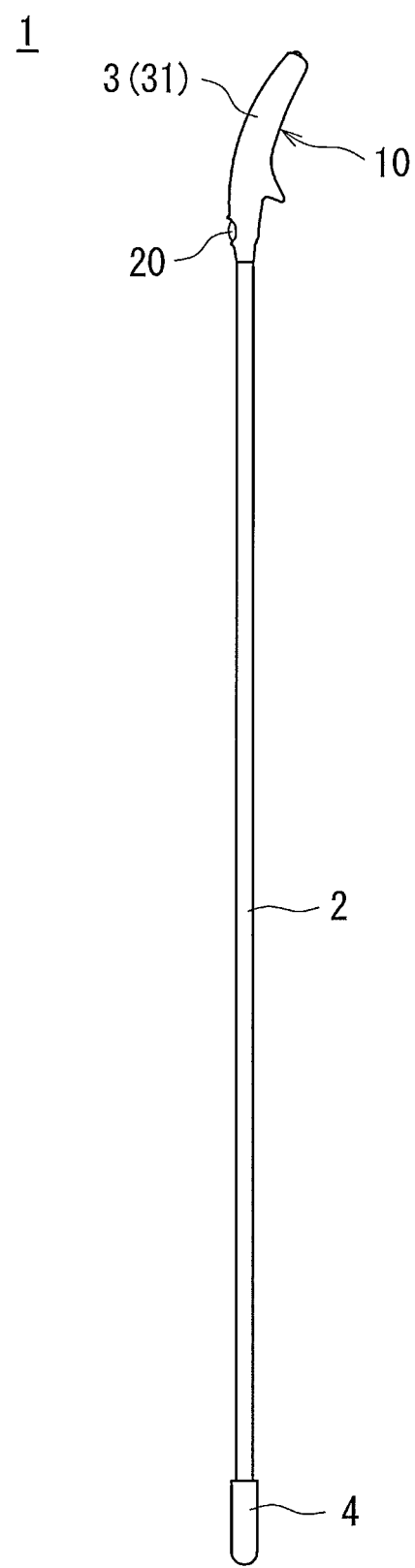
FIG. 1 is a diagram showing a white cane including a walking support system according to an embodiment.

FIG. 1 is a diagram showing a white cane 1 including a walking support system 10 according to the present embodiment. As shown in FIG. 1, the white cane 1 includes a shaft portion 2, a grip portion 3, and a tip portion (ferrule) 4.

The shaft portion 2 is rod-shaped with a hollow substantially circular section, and is made of aluminum alloy, glass-fiber reinforced resin, carbon fiber reinforced resin, or the like.

The grip portion 3 is configured by mounting a cover 31 made of an elastic body such as rubber to a base end portion (upper end portion) of the shaft portion 2. The grip portion 3 of the white cane 1 according to the present embodiment is slightly curved on the tip side (upper side in FIG. 1) in consideration of gripping ease and slipperiness when the visually impaired person (pedestrian) grips the grip portion 3.

The tip portion 4 is a substantially bottomed cylindrical member made of hard synthetic resin or the like, and is fitted onto the tip end portion of the shaft portion 2 and fixed to the shaft portion 2 by means such as adhesion or screwing. For safety, an end surface of the tip portion 4 on the tip end side has a hemispherical shape.

The white cane 1 according to the present embodiment is a straight cane that cannot be folded. However, the white cane 1 may be a cane that is foldable or expandable/contractable at an intermediate location or at a plurality of locations of the shaft portion 2.

Configuration of Walking Support System

A feature of the present embodiment is the walking support system 10 built in the white cane 1. Hereinafter, the walking support system 10 will be described.

Figure 2:
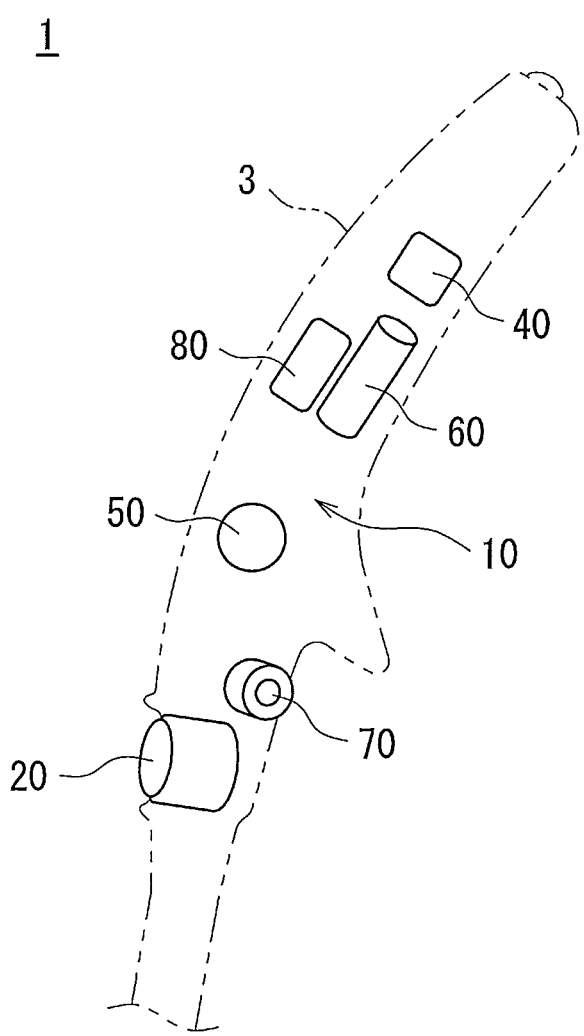
FIG. 2 is a schematic diagram showing the inside of a grip portion of the white cane.
Figure 3:
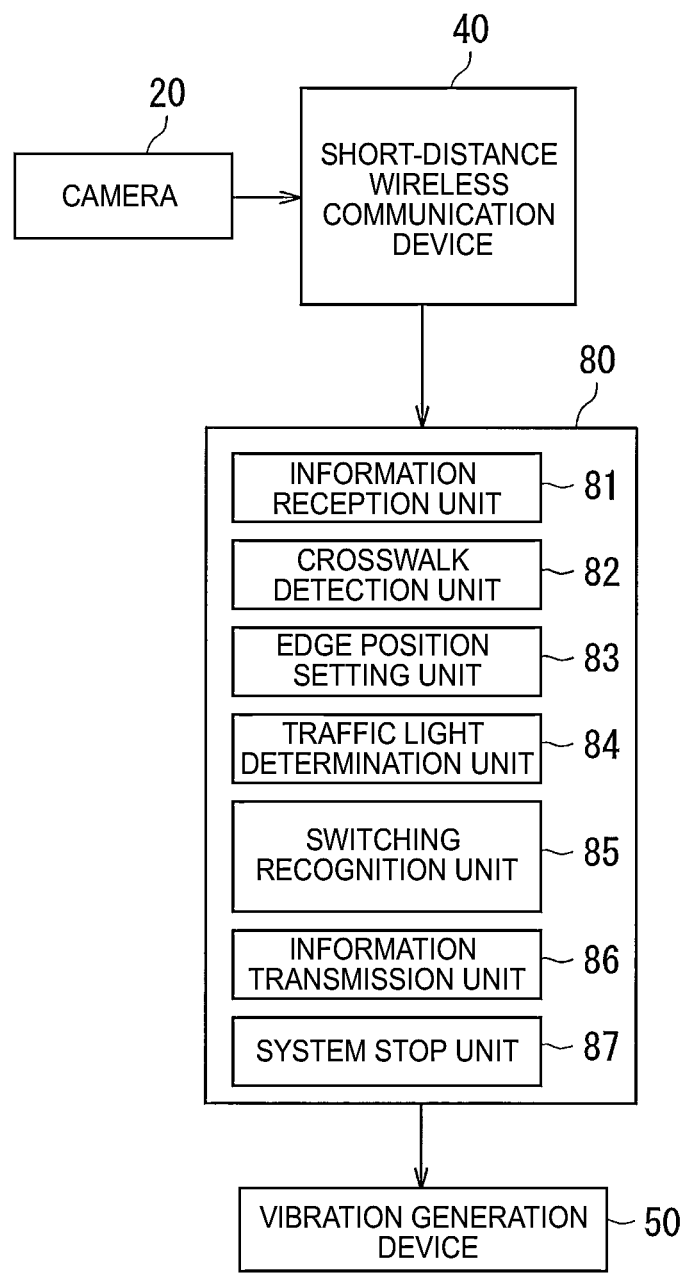
FIG. 3 is a block diagram showing a schematic configuration of a control system of the walking support system.

FIG. 2 is a schematic diagram showing the inside of the grip portion 3 of the white cane 1. As shown in FIG. 2, the walking support system 10 according to the present embodiment is built in the white cane 1. FIG. 3 is a block diagram showing a schematic configuration of a control system of the walking support system 10.

As shown in these figures, the walking support system 10 includes a camera (image acquisition unit) 20, a short-distance wireless communication device 40, a vibration generation device (notification unit) 50, a battery 60, a charging socket 70, a control device 80, and the like.

The camera 20 is embedded in a front surface (a surface facing the traveling direction of the visually impaired person) of the grip portion 3 on a root portion of the grip portion 3 and captures an image of the front in the traveling direction of the visually impaired person. The camera 20 is configured by, for example, a charge coupled device (CCD) or a complementary metal oxide semiconductor (CMOS). The configuration and the arrangement position of the camera 20 are not limited to those described above, and the camera 20 may be embedded in the front surface (a surface facing the traveling direction of the visually impaired person) of the shaft portion 2, for example.

As a feature of the camera 20, the camera 20 is configured as a wide-angle camera capable of acquiring an image of the front in the traveling direction of the walking visually impaired person, the image including both a white line closest to the visually impaired person of the white lines of the crosswalk and the traffic light located in front of the visually impaired person (for example, a pedestrian traffic light) when the visually impaired person reaches the crosswalk. That is, the camera 20 is configured to be capable of capturing an image of both the frontmost white line of the crosswalk near the feet of the visually impaired person (at a position slightly ahead of the feet) at the time when the visually impaired person has reached a position before the crosswalk, and the traffic light installed on a point at the crossing destination. The view angle required for the camera 20 is appropriately set so that an image including both the white line (white line of the crosswalk) closest to the visually impaired person and the traffic light can be acquired as described above.

The short-distance wireless communication device 40 is a wireless communication device for performing short-distance wireless communication between the camera 20 and the control device 80. For example, the short-distance wireless communication device 40 is configured to perform short-distance wireless communication between the camera 20 and the control device 80 by known communication means such as Bluetooth (registered trademark) to wirelessly transmit information of the image captured by the camera 20 to the control device 80.

The vibration generation device 50 is arranged above the camera 20 in the root portion of the grip portion 3. The vibration generation device 50 vibrates in response to the operation of the built-in motor and transmits the vibration to the grip portion 3, thereby various notifications can be performed toward the visually impaired person gripping the grip portion 3. Specific examples of the notifications performed to the visually impaired person through the vibration of the vibration generation device 50 will be described later.

The battery 60 is configured by a secondary battery that stores electric power for the camera 20, the short-distance wireless communication device 40, the vibration generation device 50, and the control device 80.

The charging socket 70 is a part where a charging cable is connected when storing electric power in the battery 60. For example, the charging cable is connected when the visually impaired person charges the battery 60 from a household power source at home.

The control device 80 includes, for example, a processor such as a central processing unit (CPU), a read only memory (ROM) that stores a control program, a random access memory (RAM) that stores data temporarily, an input/output port, and the like.

The control device 80 includes, as functional units realized by the control program, an information reception unit 81, a crosswalk detection unit 82, an edge position setting unit 83, a traffic light determination unit 84, a switching recognition unit 85, an information transmission unit 86, and a system stop unit 87. An outline of the functions of each of the above units will be described below.

The information reception unit 81 receives information of the image captured by the camera 20 from the camera 20 via the short-distance wireless communication device 40 at a predetermined time interval.

The crosswalk detection unit 82 recognizes the crosswalk in the image from the information of the image received by the information reception unit 81 (information of the image captured by the camera 20) and detects the position of each white line of the crosswalk. In particular, the crosswalk detection unit 82 detects the edge position (frontmost position) of the white lines of the crosswalk that is closest to the pedestrian.

Figure 4:
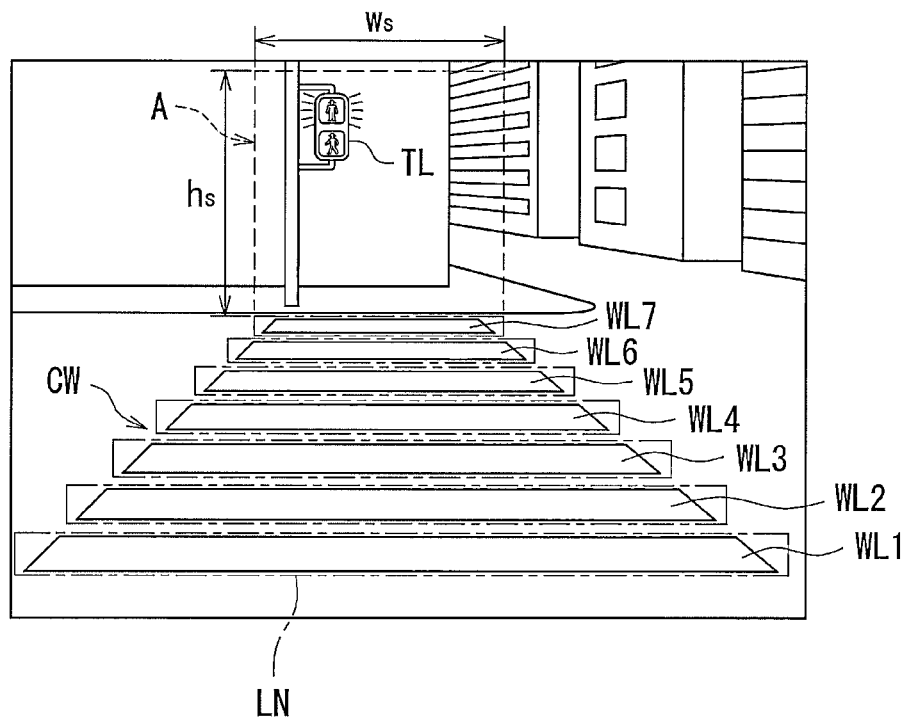
FIG. 4 is a diagram showing an example of an image captured by a camera.

Specifically, as shown in FIG. 4 (a figure showing an example of the image captured by the camera 20), a boundary box is set for each of the plurality of white lines WL1 to WL7 that constitutes a crosswalk CW (see long-dashed short-dashed lines in FIG. 4). For example, the white lines WL1 to WL7 of the crosswalk CW are confirmed by a known matching process, and the boundary boxes are set for the confirmed white lines WL1 to WL7. The white lines WL1 to WL7 may be confirmed using data of the pre-annotated white lines (labeled data of the white lines), and the boundary boxes may be set for the confirmed white lines WL1 to WL7.

Of these boundary boxes, the crosswalk detection unit 82 detects the lower end position of the boundary box closest to the pedestrian (see LN in FIG. 4). This lower end position corresponds to the "edge position of the crosswalk closer to the pedestrian". In the present embodiment, a boundary box is set for each white line WL1 to WL7 and the lower end position LN of the boundary box positioned on the lowest side in the image is defined as the "edge position of the crosswalk closer to the pedestrian". However, of the white lines WL1 to WL7 that have been confirmed in the image, the lower end position of the white line WL1 positioned on the lowest side may be defined as the "edge position of the crosswalk closer to the pedestrian", without setting the boundary boxes.

As described later, the boundary boxes are used for specifying a stop position of the visually impaired person, specifying a position of a traffic light TL, specifying the traveling direction of the visually impaired person when the visually impaired person crosses the crosswalk CW, determining crossing completion of the crosswalk CW, and the like. Details of the above will be described later.

Figure 14:
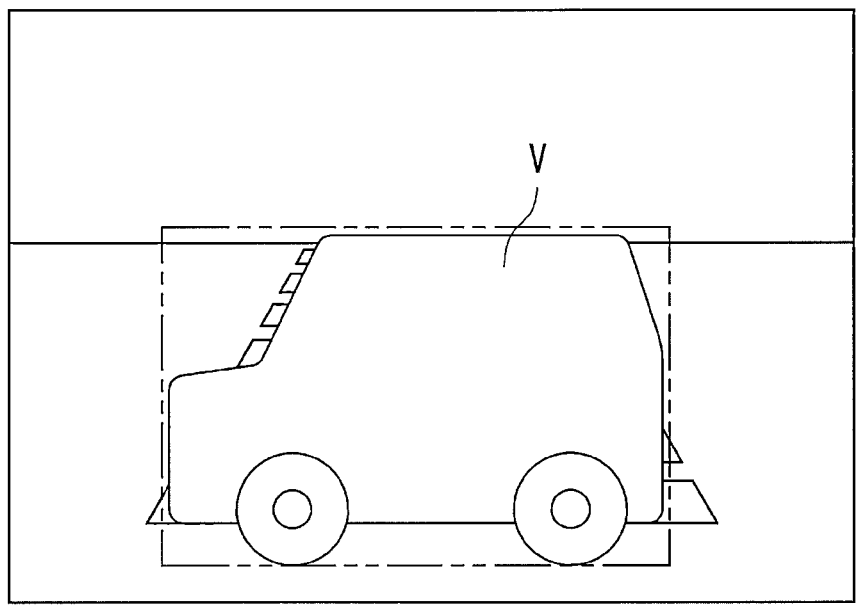
FIG. 14 is a diagram showing a third pattern in which a vehicle exists in an image captured by the camera.
Figure 15:
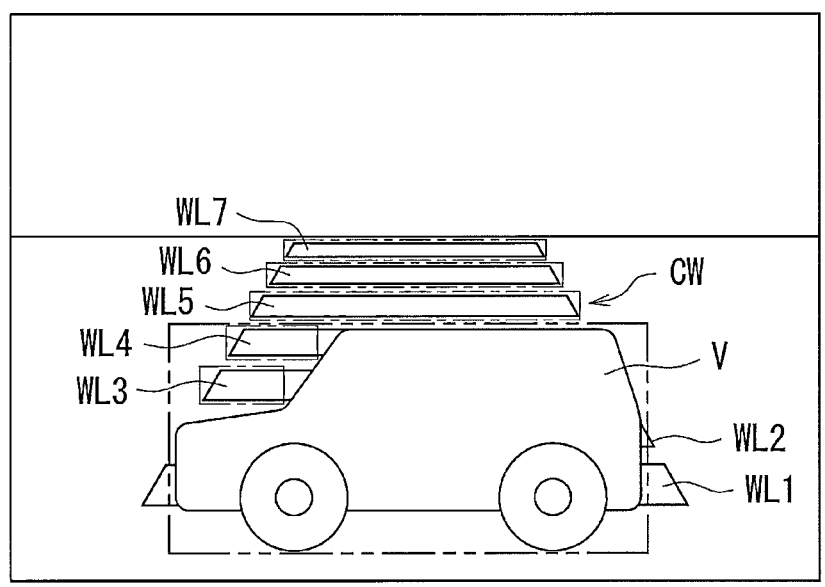
FIG. 15 is a diagram showing a fourth pattern in which a vehicle exists in an image captured by the camera.

The edge position setting unit 83 is a functional unit that is a feature of the present embodiment, and is a functional unit that performs processes for obtaining a position for performing a stop notification (a position regarded as the edge position of the crosswalk CW closer to the pedestrian) when the stop notification is performed to the visually impaired person by vibration of the vibration generation device 50 in the case where an obstacle such as a vehicle parked on the street exists on the crosswalk CW (see FIGS. 14 and 15). That is, the edge position setting unit 83 sets an edge position of an obstacle V closer to the pedestrian in the image captured by the camera 20 as the edge position of the crosswalk CW closer to the pedestrian, when the crosswalk detection unit 82 cannot detect the edge position of the crosswalk CW closer to the pedestrian (the lower end position LN) due to the obstacle V existing on the crosswalk CW. In other words, the edge position setting unit 83 is a functional unit that can perform a process of regarding the edge position of the obstacle V closer to the pedestrian as the edge position of the crosswalk CW closer to the pedestrian. Details of the process of setting the edge position closer to the pedestrian when the obstacle V exists on the crosswalk CW will be described later.

The traffic light determination unit 84 determines whether the state of the traffic light TL is either a red light (stop instruction state) or a green light (crossing permission state) from the information of the image received by the information reception unit 81. In estimating an existing area of the traffic light TL in the image received by the information reception unit 81, of the boundary boxes set for the white lines WL1 to WL7 that have been recognized as described above, the coordinates of the farthest boundary box in the image is specified, and as shown in FIG. 4, a quadrangle (a quadrangle having a width dimension of $w_s$ and a height dimension of $h_s$) that contacts the upper side of the above boundary box (the boundary box set for the white line WL7 positioned at the farthest position, of the recognized white lines WL1 to WL7) is defined. With the quadrangle defined as an area A of the traffic light TL (existing area of the traffic light TL), a cropped range is output. At this time, the cropped range may be a square or a rectangle. A general object detection algorithm or a general rule-based algorithm is used for determining the state of the traffic light (color detection) performed by the traffic light determination unit 84.

The switching recognition unit 85 recognizes that the state of the traffic light TL determined by the traffic light determination unit 84 has switched from the red light to the green light. Upon recognizing this switching of the traffic light, the switching recognition unit 85 transmits a switching signal to the information transmission unit 86. The switching signal is transmitted from the information transmission unit 86 to the vibration generation device 50. In conjunction with receiving the switching signal, the vibration generation device 50 vibrates in a predetermined pattern, thereby performing a notification for permitting crossing of the crosswalk (crossing start notification) to the visually impaired person, due to the fact that the traffic light TL has switched from the red light to the green light.

The system stop unit 87 stops the walking support system 10 and transmits information on the stop of the walking support system 10 to the vibration generation device 50 via the information transmission unit 86 when a state where the crosswalk detection unit 82 does not recognize the crosswalk CW continues for a predetermined time. Here, "stopping the walking support system 10" refers to a state where various notifications performed by at least the vibration of the vibration generation device 50 are stopped. Details of the process of stopping the walking support system 10 will be described later.

Walking Support Operation

Next, a walking support operation performed by the walking support system 10 configured as described above will be described. First, an outline of the present embodiment will be described.

Outline of Present Embodiment

Here, a time during walking of the visually impaired person is indicated as $t \in [0,T]$ and a variable representing the state of the visually impaired person is indicated as $s \in R^T$. The state variable at time t is represented by an integer of $s_t \in \{-1,0,1,2\}$, each of which represents a system stop state ($s_t=-1$), a walking state ($s_t=0$), a stop state ($s_t=1$), and a crossing state ($s_t=2$). Here, the system stop state is a state where the walking support system 10 has stopped because the stop condition of the system has been satisfied. Specifically, as described above, in the walking support system 10 according to the present embodiment, the walking support system 10 is stopped when the state where the crosswalk detection unit 82 does not recognize the crosswalk CW continues for a predetermined time (the stop condition of the system is satisfied), and the system stop state refers to a state where the walking support system 10 has stopped because the stop condition of the system has been satisfied. For the walking state, for example, a state where the pedestrian is walking toward an intersection (an intersection including the traffic light TL and the crosswalk CW) is assumed. For the stop state, a state where the visually impaired person has reached a position before the crosswalk CW and is stopped (not walking) while waiting for the traffic light to change (waiting for the traffic light to switch from the red light to the green light) is assumed. For the crossing state, a state where the visually impaired person is crossing the crosswalk CW is assumed.

The present embodiment proposes an algorithm for obtaining an output $y \in R^T$ for the purpose of supporting walking of the visually impaired person when the image $X_t \in R^{w_0 \times h_0}$ ($w_0$ and $h_0$ each represent the longitudinal image size and the lateral image size) captured by the camera 20 at time t is input. Here, the output for supporting walking of the visually impaired person is represented by an integer of $y_t \in \{1,2,3,4,5\}$, each of which represents a stop instruction ($y_t=1$), a walking instruction ($y_t=2$), a right deviation warning ($y_t=3$), a left deviation warning ($y_t=4$), and a system stop notification ($y_t=5$). In the following description, the stop instruction may be referred to as the stop notification. Further, the walking instruction may be referred to as the walking notification or the crossing notification. These instructions (notifications) and warnings are performed to the visually impaired person by the vibration pattern of the vibration generation device 50. The visually impaired person knows in advance the relationship between the instructions (notifications) and the warnings and the vibration patterns of the vibration generation device 50, and grasps the type of the instruction and the warning by sensing the vibration pattern of the vibration generation device 50 from the grip portion 3.

As described later, there are a function for determining the transition of a parameter s representing the state of the visually impaired person (hereinafter referred to as state transition function) $f_0$, $f_1$, $f_2$, and a state transition function $f_3$ for determining a deviation from the crosswalk (deviation in the right and left direction). These state transition functions $f_0$ to $f_3$ are stored in the ROM. Specific examples of the state transition functions $f_0$ to $f_3$ will be described later.

Outline of Output Parameter y and State Transition Function $f_i$

The above-mentioned output $y_t \in \{1,2,3,4,5\}$, for supporting walking of the visually impaired person will be described.

As described above, as the output $y_t$, for the purpose of supporting walking of the visually impaired person, there are five types of outputs, namely, the stop instruction ($y_t=1$), the walking instruction ($y_t=2$), the right deviation warning ($y_t=3$), the left deviation warning ($y_t=4$), and the system stop notification ($y_t=5$).

Figure 5:
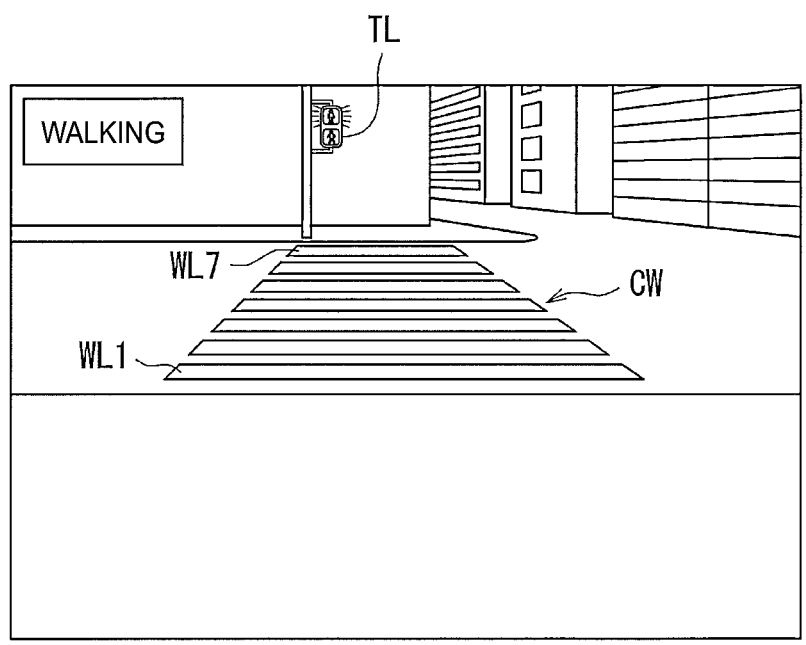
FIG. 5 is a diagram showing an example of an image captured by the camera when a visually impaired person is in a walking state heading toward a crosswalk.
Figure 6:
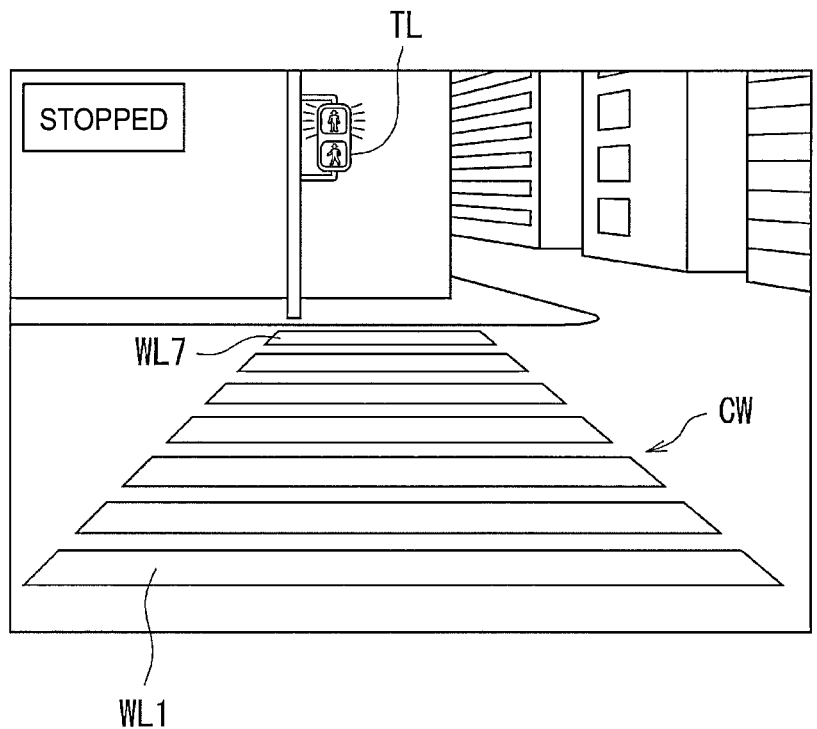
FIG. 6 is a diagram showing an example of an image captured by the camera at a timing when the visually impaired person has reached the crosswalk.

The stop instruction ($y_t=1$) is an instruction for notifying the visually impaired person to stop walking at the time when the walking visually impaired person has reached a position before the crosswalk. For example, when the image captured by the camera 20 indicates a state shown in FIG. 5 (a figure showing an example of the image captured by the camera 20 when the visually impaired person is in the walking state heading toward the crosswalk CW), the distance from the crosswalk CW is relatively long, so that the stop instruction ($y_t=1$) is not performed and the visually impaired person is caused to continue the walking state ($s_t=0$). However, when the image captured by the camera 20 indicates a state shown in FIG. 6 (a figure showing an example of the image captured by the camera 20 at a timing when the visually impaired person has reached the crosswalk CW), it is a timing that the visually impaired person has reached a position before the crosswalk CW, so that the stop instruction ($y_t=1$) is output and the visually impaired person is notified to stop walking. The determination on whether the condition for performing the stop instruction ($y_t=1$) is satisfied (the determination based on a calculation result of the state transition function) will be described later.

The walking instruction ($y_t=2$) is a notification for instructing the visually impaired person to walk (cross the crosswalk CW) when the traffic light TL switches from the red light to the green light. For example, when the visually impaired person is in the stop state ($s_t=1$) before the crosswalk CW and the traffic light TL switches from the red light to the green light based on the image captured by the camera 20, the walking instruction ($y_t=2$) is output to notify the visually impaired person to start crossing the crosswalk CW. The determination on whether the condition for performing the walking instruction ($y_t=2$) is satisfied (the determination based on a calculation result of the state transition function) will also be described later.

In the present embodiment, the timing for performing the walking instruction ($y_t=2$) is the timing at which the state of the traffic light TL is switched from the red light to the green light. That is, the walking instruction ($y_t=2$) is not performed even if the traffic light TL is already at the green light when the visually impaired person reaches the crosswalk CW, and the walking instruction ($y_t=2$) is performed at the timing at which the traffic light TL is switched to the green light after the traffic light TL once switches to the red light. This makes it possible to secure sufficient time during which the traffic light TL is at the green light when the visually impaired person crosses the crosswalk CW, and makes it difficult to cause a situation where the traffic light TL switches from the green light to the red light while the visually impaired person is crossing the crosswalk CW.

Figure 7:
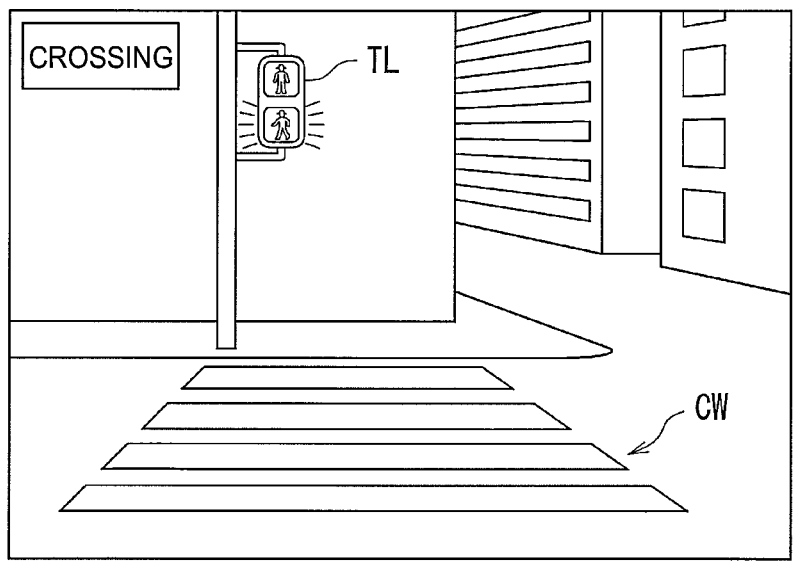
FIG. 7 is a diagram showing an example of an image captured by the camera when the visually impaired person is crossing the crosswalk in a crossing state.
Figure 8:
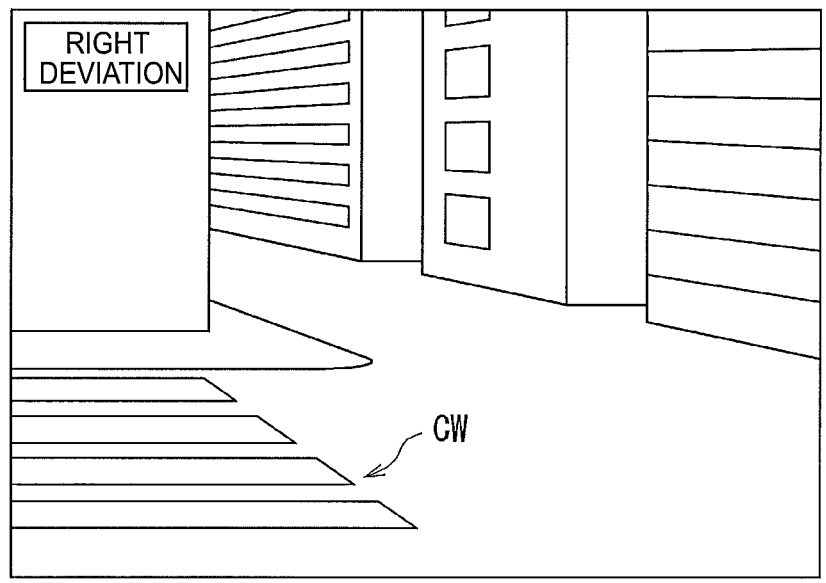
FIG. 8 is a diagram showing an example of an image captured by the camera when the visually impaired person crossing the crosswalk in the crossing state is walking toward a direction deviating to the right of the crosswalk.

The right deviation warning ($y_t=3$) is a notification for warning the visually impaired person that there is a risk of deviating to the right from the crosswalk CW, when the visually impaired person crossing the crosswalk CW is walking in a direction deviating to the right from the crosswalk CW. For example, in a state where the image captured by the camera 20 is in a state shown in FIG. 7 (a figure showing an example of the image captured by the camera 20 when the visually impaired person is crossing the crosswalk CW in the crossing state) and in a situation where the visually impaired person is crossing the crosswalk CW in the crossing state ($s_t=2$), when the image captured by the camera 20 changes to a state shown in FIG. 8 (a figure showing an example of the image captured by the camera 20 when the visually impaired person crossing the crosswalk CW in the crossing state is walking in the direction deviating to the right of the crosswalk CW), the visually impaired person is walking in the direction deviating to the right from the crosswalk CW, so that the right deviation warning ($y_t=3$) is output to warn the visually impaired person.

Figure 9:
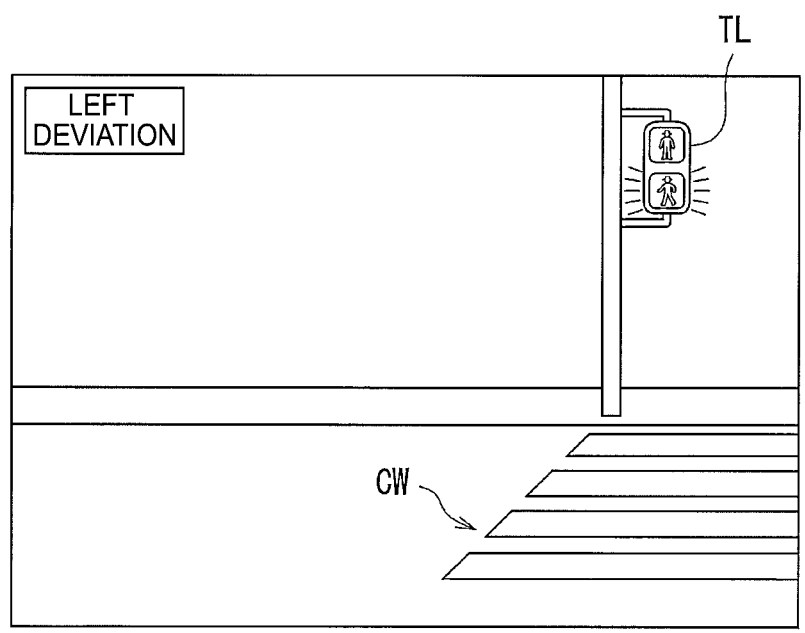
FIG. 9 is a diagram showing an example of an image captured by the camera when the visually impaired person crossing the crosswalk in the crossing state is walking toward a direction deviating to the left of the crosswalk.

The left deviation warning ($y_t=4$) is a notification for warning the visually impaired person that there is a risk of deviating to the left from the crosswalk CW, when the visually impaired person crossing the crosswalk CW is walking in a direction deviating to the left from the crosswalk CW. For example, in a state where the image captured by the camera 20 is in the state shown in FIG. 7 and in a situation where the visually impaired person is crossing the crosswalk CW in the crossing state ($s_t=2$), when the image captured by the camera 20 changes to a state shown in FIG. 9 (a figure showing an example of the image captured by the camera 20 when the visually impaired person crossing the crosswalk CW in the crossing state is walking in the direction deviating to the left of the crosswalk CW), the visually impaired person is walking in the direction deviating to the left from the crosswalk CW, so that the left deviation warning ($y_t=4$) is output to warn the visually impaired person.

The determination on whether the conditions for performing the right deviation warning ($y_t=3$) and the left deviation warning ($y_t=4$) are satisfied (the determination based on a calculation result of the state transition function) will also be described later.

The system stop notification ($y_t=5$) is a notification for notifying the visually impaired person that the walking support system 10 has stopped when the system stop condition is satisfied. Specifically, in a situation where an obstacle V exists on the crosswalk CW and the entire crosswalk CW is covered by the obstacle V (most or all of the white lines WL1 to WL7 of the crosswalk CW are covered by the obstacle V) in the image acquired by the camera 20, the existence of the crosswalk CW cannot be recognized (whether the crosswalk CW exists cannot be determined) from the image acquired by the camera 20. That is, there is a possibility that a stop notification (stop notification due to the existence of the obstacle V) is performed even though the crosswalk CW does not exist, and the reliability of the operation of the walking support system 10 (reliability of the stop notification) cannot be obtained sufficiently. Therefore, in such a situation, the state where the crosswalk CW is not recognized continues for a predetermined time, so that the walking support system 10 is stopped on condition that the crosswalk CW is not recognized for the predetermined time to avoid performing an erroneous stop notification. In addition to the above, information that the walking support system 10 has stopped is transmitted to the vibration generation device 50, and the vibration generation device 50 informs the pedestrian that the walking support system 10 has stopped.

Feature Amount Used for Walking Support

Next, the feature amount used for walking support for the visually impaired person will be described. In order to appropriately perform the various notifications to the visually impaired person, such as the stop notification of walking before the crosswalk CW and the subsequent crossing start notification, it is essential that the position of the crosswalk CW (the position of the frontmost white line WL1 of the crosswalk CW) and the state of the traffic light TL (whether the traffic light TL is a green light or a red light) are accurately recognized via the information from the camera 20. That is, it is necessary to construct a model expression that reflects the position of the white line WL1 and the state of the traffic light TL, and to be able to grasp the current situation of the visually impaired person according to this model expression.

In the following description of the feature amount and the state transition function, as a basic operation of the walking support system 10, a case where an obstacle V does not exist on the crosswalk CW and the crosswalk CW is recognized (at least the white line WL1 positioned in the frontmost position is recognized) in the image acquired by the camera 20 will be described.

Figure 10:
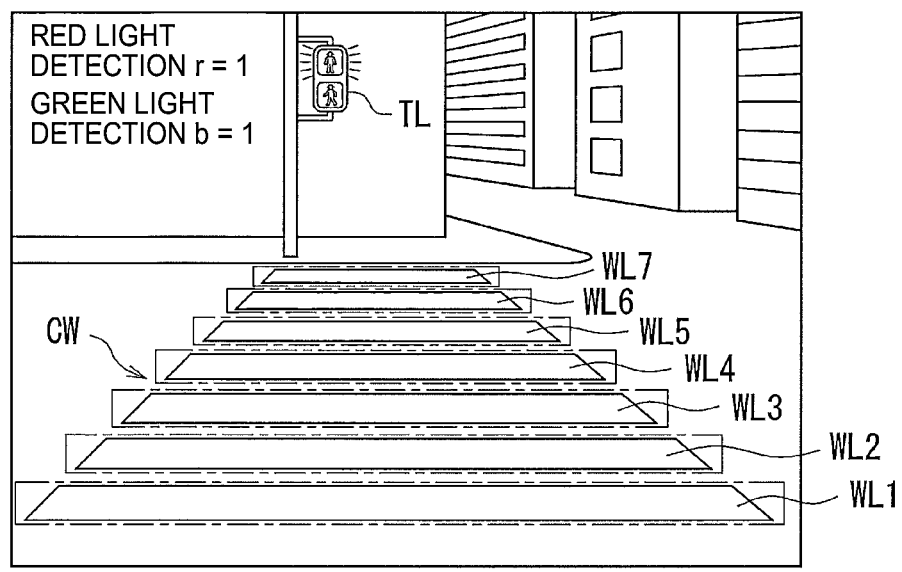
FIG. 10 is a diagram showing a crosswalk and a traffic light that have been recognized.
Figure 11:
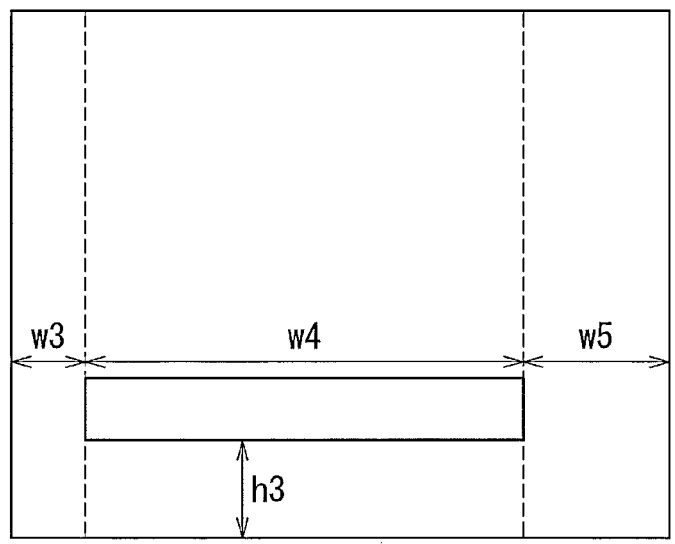
FIG. 11 is a diagram illustrating dimensions of each portion of a boundary box for a white line of the crosswalk that has been recognized.

FIGS. 10 and 11 show an outline of the feature amounts $\{w_3, w_4, w_5, h_3, r, b\}^T \in R^6$ used for the walking support for the visually impaired person. The characters r and b represent the detection results (0: undetected, 1: detected) of the state (red light and green light) of the traffic light TL, respectively. When detecting the state of the traffic light TL, as described above, the area A surrounded by the dashed line in FIG. 4 is extracted to recognize the state of the traffic light TL. The characters $w_3, w_4, w_5, h_3$ are defined as shown in FIG. 11 using a boundary box for the white line WL1 positioned in the frontmost position of the white lines WL1 to WL7 of the crosswalk CW recognized by the crosswalk detection unit 82. That is, $w_3$ is the distance from the left end of the image to the left end of the boundary box (corresponding to the left end of the white line WL1), $w_4$ is the width dimension of the boundary box (corresponding to the width dimension of the white line WL1), $w_5$ is the distance from the right end of the image to the right end of the boundary box (corresponding to the right end of the white line WL1), and $h_3$ is the distance from the lower end of the image to the lower end of the boundary box (corresponding to the front edge of the white line WL1).

When the function to detect the crosswalk CW and the traffic light TL using deep learning is defined as g and the boundary boxes of the crosswalk CW and the traffic light TL that have been predicted using the image $X_t \in R^{w0 \times h0}$ captured by the camera 20 at time t are expressed as $g(X_t)$, a feature amount required to support walking of the visually impaired person can be expressed by the following expression (1).

Expression 1

$$j(t) = \{w_3^i, w_4^i, w_5^i, h_3^i, r^i, b^i\}^T = \phi \circ g(X_t) \tag{1}$$

Here

Expression 2

$$\phi: R^{p l \times 4} \mapsto R^6 \tag{2}$$

is an operator for extracting the feature amount j(t) and for performing post-processing on g($X_t$), and p1 is the maximum number of boundary boxes per frame.

State Transition Function

Next, the state transition function will be described. As described above, the state transition function is used to determine whether the condition for notifying each of the stop instruction ($y_t=1$), the walking instruction ($y_t=2$), the right deviation warning ($y_t=3$), and the left deviation warning ($y_t=4$) is satisfied.

The state amount (state variable) $s_{t+1}$ at time t+1 can be expressed by the following expression (3) using the time history information J={j(0), j(1), . . . , j(t)} with respect to the feature amount of the crosswalk CW, the current state amount (state variable) $s_t$, and the image $X_{t+1}$ captured at time t+1.

Expression 3

$$s_{t+1} = f(J, s_t, X_{t+1}) \tag{3}$$

The state transition function f in expression (3) can be defined as the following expression (4) according to the state amount at the current time.

Expression 4

$$f(J, s_t, X_{t+1}) = \begin{cases} f_0(J, X_{t+1}) & \text{if } s_t = 0 \text{ (Walking)} \\ f_1(J, X_{t+1}) & \text{if } s_t = 1 \text{ (Stop)} \\ f_2(J, X_{t+1}) & \text{if } s_t = 2 \text{ (Crossing)} \end{cases} \tag{4}$$

In other words, with the transition of walking for the visually impaired person being repeated as follows: walking (for example, walking toward the crosswalk CW)→stop (for example, stopping before the crosswalk CW)→crossing (for example, crossing the crosswalk CW)→walking (for example, walking after the crossing completion of the crosswalk CW), the state transition function for determining whether the condition for performing the stop instruction ($y_t=1$) to the visually impaired person in the walking state ($s_t=0$) is satisfied is $f_0(J, X_{t+1})$, the state transition function for determining whether the condition for performing the crossing (walking) instruction ($y_t=2$) to the visually impaired person in the stop state ($s_t=1$) is satisfied is $f_1(J, X_{t+1})$, and the state transition function for determining whether the condition for notifying the visually impaired person in the crossing state ($s_t=2$) of walking (completion of crossing) is satisfied is $f_2(J, X_{t+1})$. Further, the state transition function for determining whether the condition for warning the visually impaired person in the crossing state ($s_t=2$) of deviation from the crosswalk CW is satisfied is $f_3(J, X_{t+1})$.

Hereinafter, the state transition function corresponding to each state amount (state variable) will be specifically described.

State Transition Function Applied in Walking State

The state transition function $f_0(j, X_{t+1})$ used when the state amount at the current time is the walking state ($s_t=0$) can be expressed by the following expressions (5) to (7) using the feature amount in expression (1).

Expression 5

$$f_0(J, X_{t+1}) = H(\alpha_1 - h_3^{t+1})H(w_4^{t+1} - \alpha_2) \times \delta\left(\sum_{i=T-t0}^{t} H(\alpha - h_3^{t+1})H(w_4^{t+1} - \alpha_2)\right) \tag{5}$$

Expression 6

$$w_4^{t+1} = I_2^T\{\phi \circ g(X_{t+1})\} \tag{6}$$

Expression 7

$$h_3^{t+1} = I_4^T\{\phi \circ g(X_{t+1})\} \tag{7}$$

Here, H is a Heaviside function and δ is a Delta function. Further, $\alpha_1$ and $\alpha_2$ are parameters used for the determination criteria, and t0 is a parameter for specifying the past state to be used. Further, $I_2=\{0,1,0,0,0,0\}^T$ and $I_4=\{0,0,0,1,0,0\}^T$ hold.

When expression (5) is used, "1" is obtained only when the conditions of $\alpha_1 > h_3$ and $w_4 > \alpha_2$ are not satisfied in the past time t0 and are satisfied for the first time at time t+1, and otherwise "0" is obtained. That is, when $\alpha_1 > h_3$ is satisfied, it is determined that the white line WL1 (the lower end of the boundary box of the white line) positioned in the frontmost position of the crosswalk CW is positioned at the feet of the visually impaired person, and when $w_4 > \alpha_2$ is satisfied, it is determined that the white line WL1 extends in a direction orthogonal to the traveling direction of the visually impaired person (the width dimension of the boundary box of the white line exceeds a predetermined dimension). When both $\alpha_1 > h_3$ and $w_4 > \alpha_2$ are satisfied, "1" is obtained.

When "1" is obtained in expression (5) in this way, it is assumed that the condition for performing the stop instruction ($y_t=1$) is satisfied, and the stop instruction (for example, a stop instruction for walking before the crosswalk CW; the stop notification) is performed to the visually impaired person in the walking state.

Further, in the present embodiment, in addition to the condition that the crosswalk CW is at the feet of the visually impaired person ($\alpha_1 > h_3$), a restriction on the width of the detected crosswalk CW ($w_4 > \alpha_2$) is added, to prevent a detection error in the case where a crosswalk other than the crosswalk CW located in the traveling direction of the visually impaired person (such as a crosswalk extending in the direction orthogonal to the traveling direction of the visually impaired person at an intersection) is included in the image $X_{t+1}$. That is, even when there is a plurality of crosswalks having different crossing directions at a road intersection or the like, the crosswalk CW that the visually impaired person should cross (the crosswalk CW with the white line WL1 extending in the direction intersecting the direction in which the visually impaired person should cross, so that the width dimension of the white line WL1 is recognized to be relatively wide) and other crosswalks (crosswalks where the width dimension of the white line is recognized to be relatively narrow) can be clearly distinguished from each other, making it possible to accurately perform the crossing start notification to the visually impaired person with high accuracy.

State Transition Function Applied in Stop State

The state transition function $f_1(j, X_{t+1})$ used when the state amount at the previous time is the stop state ($s_t=1$) can be expressed by the following expressions (8) to (10).

Expression 8

$$f_1(J, X_{t+1}) = b^{t+1} \delta\left(\sum_{i=t-t0}^{t} r^i\right) \quad (8)$$

Expression 9

$$b^{t+1} = I_6^T \{\phi \circ g(X'_{t+1})\} \quad (9)$$

Expression 10

$$r^{t+1} = I_5^T \{\phi \circ g(X'_{t+1})\} \quad (10)$$

Here, $X'_{t+1}$ is obtained by trimming and enlarging the image from $X_{t+1}$. That is, the recognition accuracy of the traffic light TL is sufficiently improved in the image $X'_{t+1}$. Further, $I_5=\{0,0,0,0,1,0\}^T$ and $I_6=\{0,0,0,0,0,1\}^T$ hold.

In expression (8), "1" is obtained only when the green light is detected for the first time at time t+1 after the red light is detected in the past time t0, and otherwise "0" is obtained.

When "1" is obtained in expression (8) in this way, it is assumed that the condition for performing the walking (crossing) instruction ($y_t=2$) is satisfied, and the crossing instruction (for example, the crossing instruction of the crosswalk; the crossing notification) is performed to the visually impaired person in the stop state.

The state transition based on the above-mentioned logic may not be possible at a crosswalk at an intersection without a traffic light. In order to solve this issue, a new parameter t1>t0 may be introduced so that when it is determined that there is no state transition from the stop state during time t1, the state transitions to the walking state.

State Transition Function Applied in Crossing State

The state transition function $f_2(j, X_{t+1})$ used when the state amount at the previous time is the crossing state ($s_t=2$) can be expressed by the following expression (11).

Expression 11

$$f_2(J, X_{t+1}) = \delta\left(\sum_{i=t-t0}^{t+1} \left(b^i + r^i + H(\alpha_1 - h_3^i)H(w_4^i - \alpha_2)\right)\right) \quad (11)$$

In expression (11), "1" is obtained only when the traffic light and the crosswalk CW at the feet of the visually impaired person cannot be detected even once from the past t−t0 to the current time t+1, and otherwise "0" is obtained. That is, "1" is obtained only when the traffic light TL and the crosswalk CW at the feet of the visually impaired person cannot be detected because the visually impaired person has completed crossing the crosswalk CW.

When "1" is obtained in expression (11) in this way, it is assumed that the condition for performing the crossing completion is satisfied, and the notification of the crossing completion (completion of crossing the crosswalk) is performed to the visually impaired person in the walking state.

State Transition Function for Determining Deviation from Crosswalk

The state transition function $f_3(j, X_{t+1})$ for determining the deviation from the crosswalk CW while the visually impaired person crosses the crosswalk CW can be expressed by the following expressions (12) to (14).

Expression 12

$$f_3(J, X_{t+1}) = H\left(\frac{\max(w_3^{t+1}, w_5^{t+1})}{w_0} - \alpha_3\right) \quad (12)$$

Expression 13

$$w_3^{t+1} = I_1^T \{\phi \circ g(X_{t+1})\} \quad (13)$$

Expression 14

$$w_5^{t+1} = I_3^T \{\phi \circ g(X_{t+1})\} \quad (14)$$

Here, $\alpha_3$ is a parameter used for a determination criterion. Further, $I_1=\{1,0,0,0,0,0\}^T$ and $I_3=\{0,0,1,0,0,0\}^T$ hold.

In expression (12), "1" is obtained when the amount of deviation from the center of the frame at the position of the detected crosswalk CW is equal to or greater than an allowable amount, and otherwise "0" is obtained. That is, "1" is obtained when the value of $w_3$ becomes larger than the predetermined value (in the case of right deviation) or when the value of $w_5$ becomes larger than the predetermined value (in the case of left deviation).

When "1" is obtained in expression (12) in this way, the right deviation warning ($y_t=3$) or the left deviation warning ($y_t=4$) is performed.

Stop Notification Operation when Obstacle Exists

There are cases where an obstacle (for example, a vehicle parked on the street) V exists on the crosswalk CW and a situation where the obstacle V covers the frontmost white line WL1 of the crosswalk CW (for example, a situation where, although the existence of the crosswalk CW is recognized, the frontmost white line WL1 is covered so that the position of the white line WL1 cannot be accurately recognized) occurs. When such a situation occurs, it is conventionally conceivable to perform, for example, a stop notification for walking to the pedestrian at the time when the obstacle V is recognized for the sake of safety. However, this may cause the pedestrian to stop at a position before the crosswalk CW more than necessary, which leads to a concern that a different obstacle may get in between the pedestrian and the crosswalk CW or the like, making it difficult to walk when resuming walking.

In view of the above point, the present embodiment makes it possible to appropriately perform a stop notification for walking to a pedestrian even when an obstacle V exists on the crosswalk CW. Hereinafter, a specific description will be given.

Figure 12:
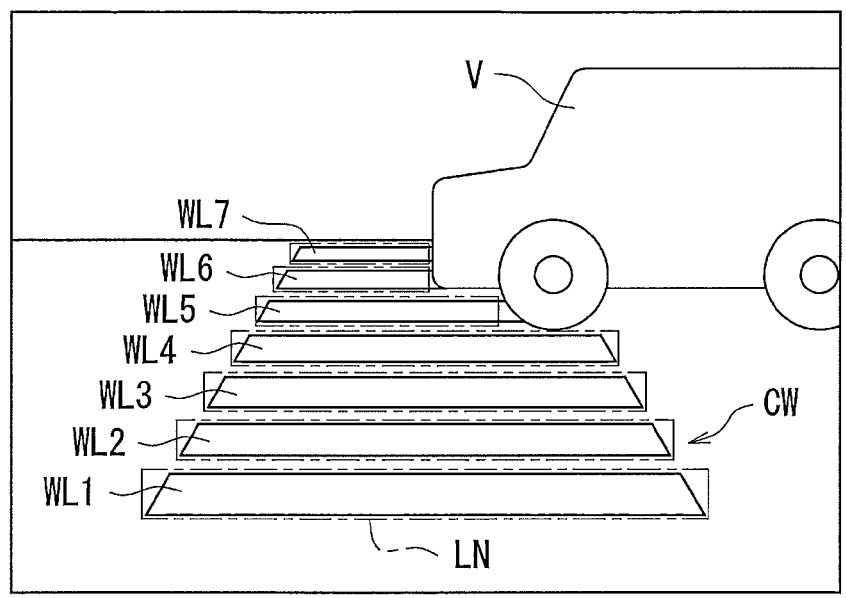
FIG. 12 is a diagram showing a first pattern in which a vehicle exists in an image captured by the camera.
Figure 13:
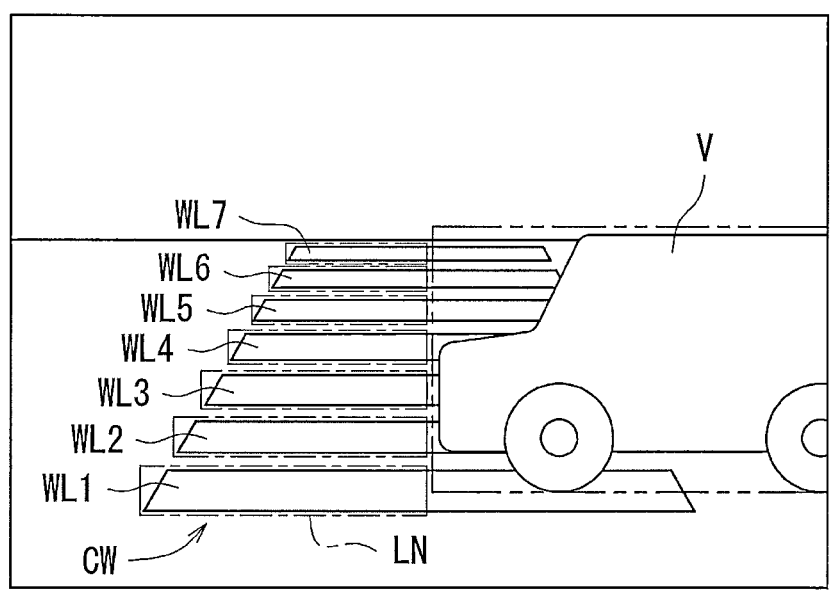
FIG. 13 is a diagram showing a second pattern in which a vehicle exists in an image captured by the camera.

FIGS. 12 to 15 are images (images captured by the camera 20) in which a part or most of the crosswalk CW is covered by a vehicle (obstacle) V at the time when the visually impaired person reaches the position before the crosswalk CW. FIG. 12 shows a state where the white line WL1 closest to the pedestrian is not covered by the vehicle V (first pattern). FIG. 13 shows a state where a part (right half) of the white line WL1 closest to the pedestrian is covered by the vehicle V (second pattern). FIG. 14 shows a state where most of the white lines of the crosswalk CW are covered by the vehicle V (third pattern). FIG. 15 shows a state where the entire white line WL1 closest to the pedestrian, the entire white line WL2 on the back side thereof, and a part (right part) of the white lines WL3 and WL4 on the back side thereof are covered by the vehicle V (fourth pattern). The long-dashed double-short-dashed line in FIGS. 13 to 15 is the boundary box set for the vehicle V recognized in the image.

In the first pattern (FIG. 12) and the second pattern (FIG. 13), the white line WL1 closest to the pedestrian can be recognized, and the frontmost position of the white line WL1 (lower end position in the image, more specifically, the lower end position LN of the boundary box of the white line WL1) can be detected. Therefore, with the state transition function $f_0(J, X_{t+1})$ in expression (5), whether the condition for performing the stop instruction ($y_t=1$) to the visually impaired person in the walking state ($s_t=0$) is satisfied can be determined. That is, when "1" is obtained in expression (5), it is assumed that the condition for performing the stop instruction ($y_t=1$) is satisfied, and the stop instruction can be performed to the visually impaired person in the walking state.

On the other hand, in the third pattern (FIG. 14), most of the white lines cannot be recognized, so that "0" is continuously obtained in expression (5). That is, even though the crosswalk CW exists ahead and the visually impaired person has reached the position before the crosswalk CW, the frontmost position of the white line WL1 cannot be recognized, so that "0" is continuously obtained in expression (5).

Further, in the fourth pattern (FIG. 15), the white line WL1 closest to the pedestrian cannot be recognized, so that $h_3$ in expression (7) is obtained as the distance between the lower end of the white line WL3 behind the white line WL1 closest to the pedestrian and the lower end position of the image (see FIG. 16), and thus $h_3$ will be calculated as a large value. In this case, the value calculated by expression (7) deviates from the predetermined range.

Further, even when the frontmost position of the white line WL1 cannot be detected by acquiring the images of the third pattern (FIG. 14) and the fourth pattern (FIG. 15), when the vehicle V subsequently moves and the frontmost position of the white line WL1 can be detected, the value of $h_3$ calculated in expression (7) becomes a value within a predetermined range, and it becomes possible to determine whether the condition for performing the stop instruction ($y_t=1$) to the visually impaired person in the walking state ($s_t=0$) is satisfied in expression (5).

However, when the vehicle V is parked or traveling at a low vehicle speed, the state where the frontmost position of the white line WL1 cannot be detected continues, so that the state where the value of $h_3$ calculated in expression (7) deviates from the predetermined range and the state where the value in expression (5) becomes "0" continues in the related art.

Therefore, in the present embodiment, the above-mentioned edge position setting unit 83 sets the edge position of the vehicle (obstacle) V closer to the pedestrian in the image captured by the camera 20 as the edge position of the crosswalk CW closer to the pedestrian. That is, the edge position setting unit 83 performs a process of regarding the edge position of the vehicle V closer to the pedestrian as the edge position of the crosswalk CW closer to the pedestrian.

As the specific process in this case, a calculation operation of a crosswalk gap distance, a calculation operation of an obstacle gap distance, and a setting operation of the edge position are performed in this order.

Figure 16:
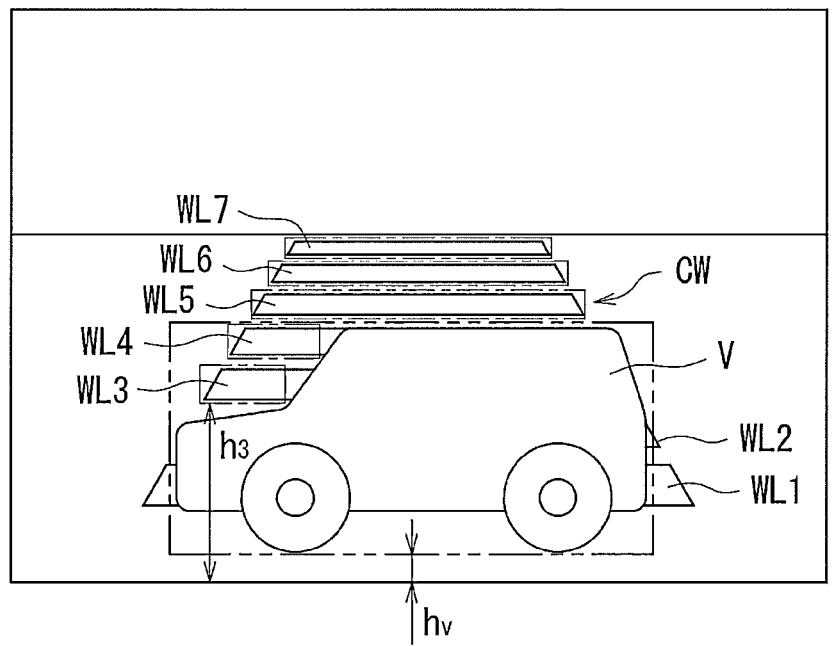
FIG. 16 is a diagram illustrating a crosswalk gap distance and an obstacle gap distance in the fourth pattern.

The calculation operation of the crosswalk gap distance is an operation of calculating the value of $h_3$, and as shown in FIG. 16, the distance $h_3$ from the lower end position of the image acquired by the camera 20 to the lower end position of the crosswalk CW in the image recognized by the image (in the case shown in FIG. 16, the lower end position of the boundary box set for the white line WL3) is calculated.

The calculation operation of the obstacle gap distance is an operation of calculating the value of $h_v$ shown in FIG. 16, and the distance $h_v$ from the lower end position of the image acquired by the camera 20 to the lower end position of the vehicle V recognized by the image (more specifically, the lower end position of the boundary box set for the vehicle V) is calculated. More specifically, the distance from the lower end position of the image to the lower end position of the boundary box set for the vehicle V is defined as $h_i$ (i is an obstacle candidate), and the obstacle gap distance $h_v$ is calculated by the following expression (15). That is, when there are multiple locations of the lower end positions of the vehicle V (for example, when a plurality of obstacles exists), the distance between the lower end position (the lower end position of the obstacle) having the shortest distance from the lower end position of the image and the lower end position of the image is calculated as the obstacle gap distance $h_v$.

Expression 15

$$h_v = \min(h_i; i=1,2,3,\ldots,N) \tag{16}$$

In the present embodiment, a boundary box is set for the obstacle (vehicle) V and the lower end position of this boundary box is defined as the "edge position of the obstacle closer to the pedestrian". However, the lowest position of the obstacle (vehicle) V whose shape has been confirmed in the image may be defined as the "edge position of the obstacle closer to the pedestrian", without setting the boundary box.

In the setting operation of the edge position, a determination index k is calculated in the following expression (16) using the crosswalk gap distance $h_3$ and the obstacle gap distance $h_v$.

Expression 16

$$k = H(h_3 - h_v) \tag{16}$$

In the case of the fourth pattern (see FIGS. 15 and 16), "1" will be obtained as the determination index k calculated in expression (16) with the crosswalk gap distance $h_3$ being significantly larger than the obstacle gap distance $h_v$. On the other hand, for example, when a part of the white line WL1 closest to the pedestrian is covered by the vehicle V (second pattern), the value obtained by subtracting the obstacle gap distance $h_v$ from the crosswalk gap distance $h_3$ is small (including the case of a negative value), so that "0" is obtained as the determination index k.

Therefore, when "1" is obtained in expression (16), the edge position of the vehicle V closer to the pedestrian in the image acquired by the camera 20 is set as the edge position of the crosswalk CW closer to the pedestrian. In this case, $h_v$ is substituted for $h_3$ in expression (5), and it is determined whether it is necessary to perform the stop notification to the pedestrian according to the result of this expression (5). That is, when "0" is obtained in expression (5), it is assumed that the condition for performing the stop instruction ($y_t=1$) is not satisfied, and the stop instruction is not performed to the visually impaired person in the walking state. In contrast, when "1" is obtained in expression (5), it is assumed that the condition for performing the stop instruction ($y_t=1$) is satisfied (the visually impaired person has reached the position before the vehicle V that is an obstacle) and the stop instruction is performed to the visually impaired person in the walking state.

Further, as in the third pattern (FIG. 14), in a state where most of the white lines WL1 to WL7 of the crosswalk CW are covered by the vehicle V, the existence of the crosswalk CW cannot be recognized (whether the crosswalk CW exists cannot be determined) from the image acquired by the camera 20. In such a situation, the state where the crosswalk CW is not recognized continues for a predetermined time, so that the walking support system 10 is stopped on condition of the above.

Specifically, whether the state where the crosswalk CW is not recognized continues for a predetermined time is determined in the following expression (17).

Expression 17

$$f_0^*(J, X_t) = \delta\left(\sum_{i=T-t1}^{t} f_0(J, X_i)\right) \quad (17)$$

When the state where the crosswalk CW is not recognized continues for a predetermined time, this expression (17) becomes a positive value. In this case, assuming that the condition for performing the system stop notification ($y_t$=5) is satisfied, the walking support system 10 is stopped, and the visually impaired person is notified of the information that the walking support system 10 has stopped. That is, the vibration generation device 50 vibrates in a pattern that notifies information that the walking support system 10 has stopped.

Walking Support Operation

Next, the flow of the walking support operation performed by the walking support system 10 will be described.

Figure 17:
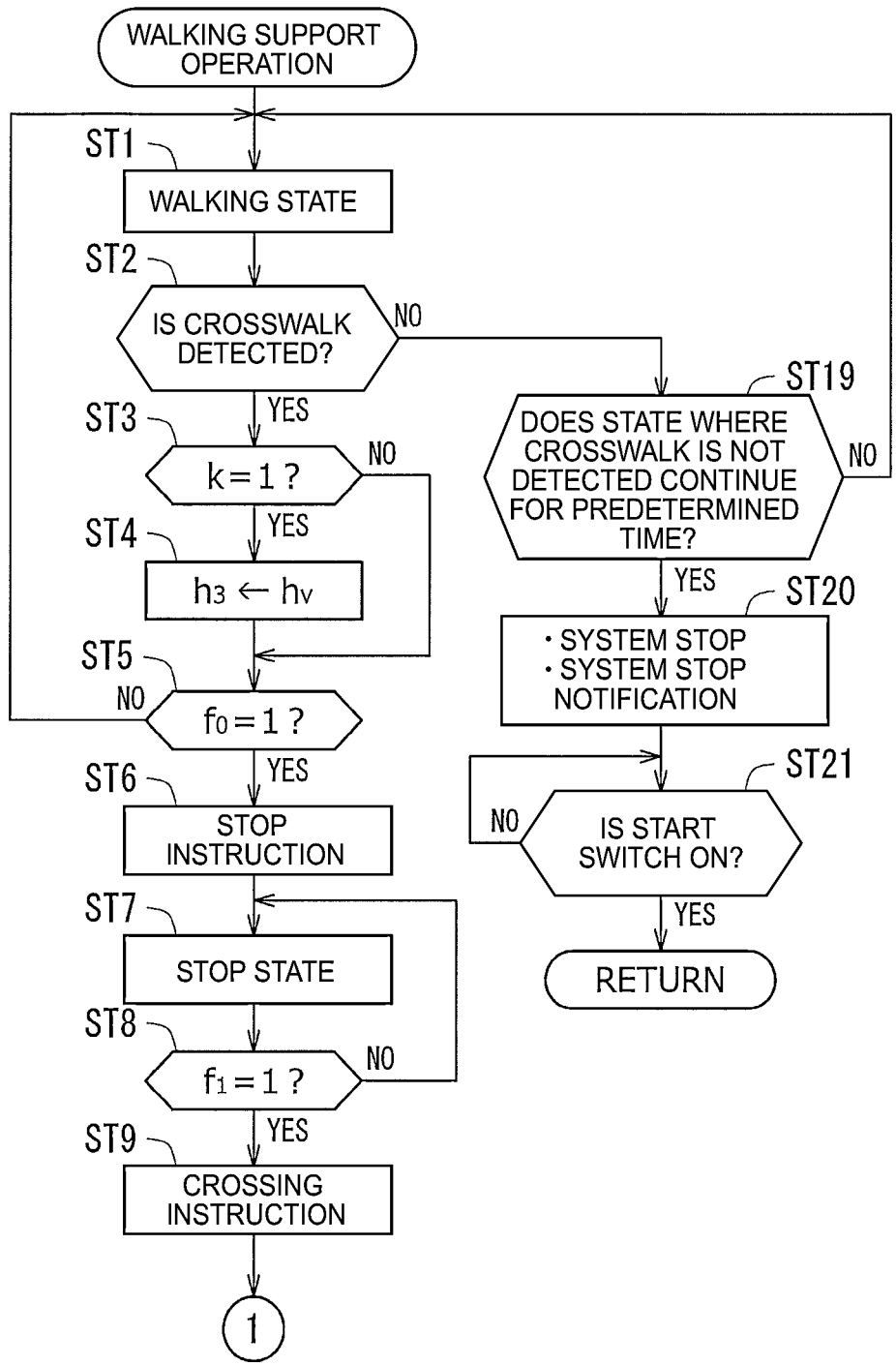
FIG. 17 is a flowchart showing a part of a procedure for a walking support operation executed by the walking support system.
Figure 18:
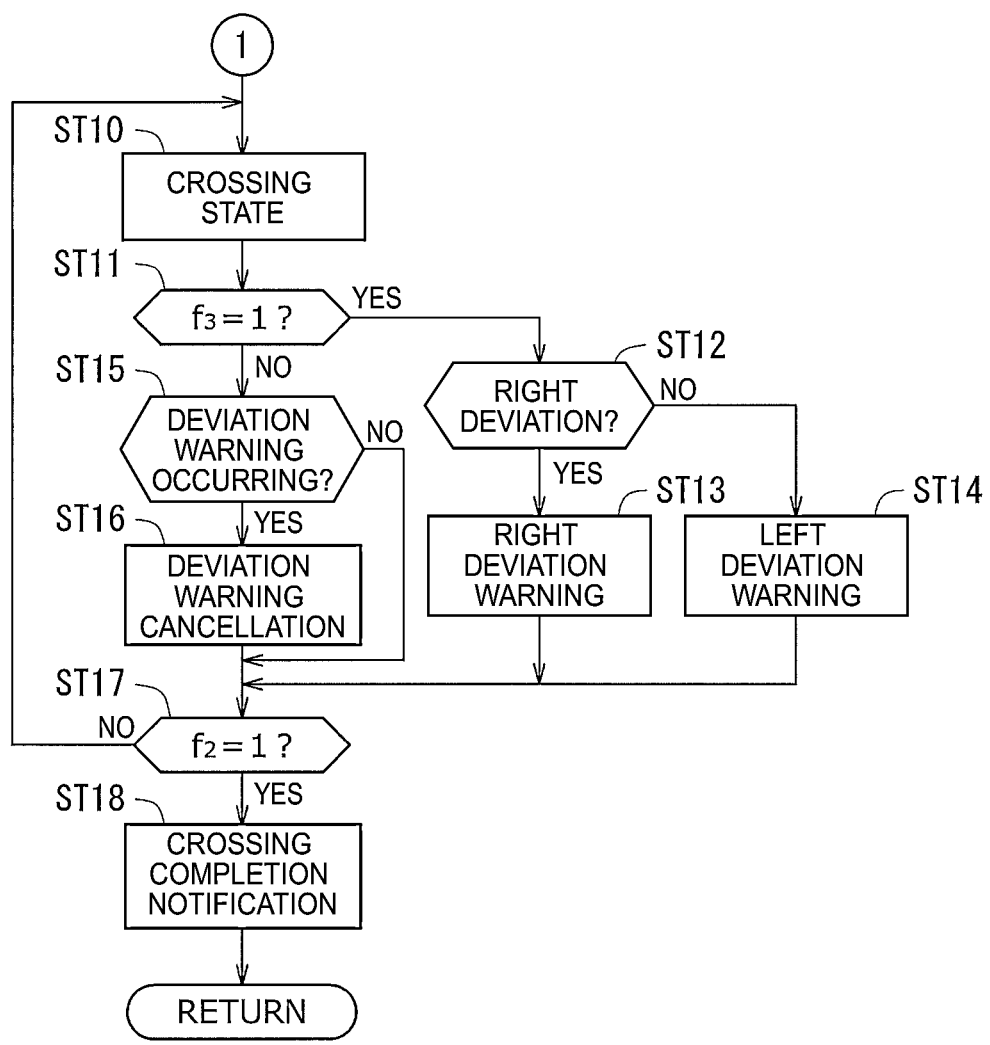
FIG. 18 is a flowchart showing another part of the procedure for the walking support operation executed by the walking support system.

FIGS. 17 and 18 are flowcharts showing a flow of a series of the walking support operation described above. This flowchart is repeatedly executed at a predetermined time interval so that one routine is executed from a predetermined time t to a predetermined time t+1 in a situation where a visually impaired person is walking on the street (on the sidewalk). In the following description, the description of the variable (J, $X_{t+1}$) in each state transition function will be omitted.

First, in the situation where the visually impaired person is in a walking state in step ST1, it is determined in step ST2 whether the existence of the crosswalk CW is detected (whether the existence of the crosswalk CW is detected by the crosswalk detection unit 82) from the image acquired by the camera 20.

When the existence of the crosswalk CW is detected and YES is determined in step ST2, the process proceeds to step ST3, and it is determined whether the determination index k calculated in expression (16) is "1" (whether the crosswalk gap distance $h_3$ is significantly larger than the obstacle gap distance $h_v$). That is, as in the fourth pattern described above (see FIGS. 15 and 16), it is determined whether the entire white line WL1 closest to the pedestrian and a part of the white line behind the white line WL1 are covered by the vehicle V.

When the determination index k is "0" and NO is determined in step ST3, the process proceeds to step ST5, and when the determination index k is "1" and YES is determined in step ST3, the process proceeds to step ST4. In step ST4, $h_v$ is substituted for $h_3$ in expression (5). That is, when NO is determined in step ST3, it is assumed that the entire white line WL1 closest to the pedestrian is not covered by the vehicle V, and the state transition function $f_0$ (the above expression 5) is calculated using the frontmost position of the white line WL1 closest to the pedestrian (more specifically, the lower end position LN of the boundary box of the white line WL1). On the other hand, when YES is determined in step ST3, it is assumed that the entire white line WL1 closest to the pedestrian and a part of the white line behind the white line WL1 are covered by the vehicle V, and the state transition function $f_0$ (the above expression 5) is calculated regarding the frontmost position of the vehicle V (more specifically, the lower end position of the boundary box of the vehicle V) as the frontmost position of the white line WL1 closest to the pedestrian.

After that, the process proceeds to step ST5, and it is determined whether "1" is obtained in the state transition function $f_0$ (the above expression 5) for determining whether the condition for performing the above-mentioned stop instruction ($y_t$=1) is satisfied, based on the frontmost position of the white line closest to the pedestrian that is set as described above.

When "0" is obtained in the state transition function $f_0$, NO is determined assuming that the condition for performing the stop instruction ($y_t$=1) is not satisfied, and the process returns to step ST1.

On the other hand, when "1" is obtained in the state transition function $f_0$, YES is determined in step ST5, and the process proceeds to step ST6. In step ST6, the stop instruction ($y_t$=1) is performed to the visually impaired person. Specifically, the vibration generation device 50 in the white cane 1 held by the visually impaired person vibrates in a pattern indicating the stop instruction (stop notification). As a result, the visually impaired person gripping the grip portion 3 of the white cane 1 recognizes that the stop instruction has been performed by sensing the vibration pattern of the vibration generation device 50, and stops walking.

In a situation where the visually impaired person is in the stop state in step ST7, it is determined in step ST8 whether "1" is obtained in the state transition function $f_1$ (the above expression 8) for determining whether the condition for performing the above-mentioned walking instruction ($y_t$=2) is satisfied.

When "0" is obtained in this state transition function $f_1$, NO is determined assuming that the condition for performing the walking instruction ($y_t$=2) is not satisfied, that is, the traffic light TL has not yet switched to the green light, and the process returns to step ST7. Since NO is determined in step ST8 until the traffic light TL switches to the green light, the operations of steps ST7 and ST8 are repeated.

When the traffic light TL switches to the green light and "1" is obtained in the state transition function $f_1$, YES is determined in step ST8, and the process proceeds to step ST9. This operation corresponds to the operation of the traffic light determination unit (the traffic light determination unit that determines whether the traffic light state is any of the stop instruction state or the crossing permission state from the information of the image area including the traffic light) 84 and the operation of the switching recognition unit (the switching recognition unit that recognizes that the state of the traffic light has switched from the stop instruction state to the crossing permission state) 85.

In step ST9, the walking (crossing) instruction ($y_t$=2) is performed to the visually impaired person. Specifically, the vibration generation device 50 in the white cane 1 held by the visually impaired person vibrates in a pattern indicating the walking instruction (crossing start notification). As a result, the visually impaired person gripping the grip portion 3 of the white cane 1 recognizes that the walking instruction has been performed and starts crossing the crosswalk CW.

In a situation where the visually impaired person is crossing the crosswalk CW in the crossing state in step ST10 (FIG. 18), it is determined in step ST11 whether "1" is obtained in the state transition function $f_3$ (the above expression 12) for determining whether the condition for warning the deviation from the crosswalk CW is satisfied.

When "1" is obtained in the state transition function $f_3$ and YES is determined in step ST11, it is determined in step ST12 whether the direction of the deviation from the crosswalk CW is the right direction (right deviation). When the direction of the deviation from the crosswalk CW is the right direction and YES is determined in step ST12, the process proceeds to step ST13, and the right deviation warning ($y_t=3$) is performed to the visually impaired person. Specifically, the vibration generation device 50 in the white cane 1 held by the visually impaired person vibrates in a pattern indicating the right deviation warning. As a result, the visually impaired person gripping the grip portion 3 of the white cane 1 recognizes that the right deviation warning has been performed, and changes the walking direction toward the left direction.

On the other hand, when the direction of the deviation from the crosswalk CW is the left direction and NO is determined in step ST12, the process proceeds to step ST14, and the left deviation warning ($y_t=4$) is performed to the visually impaired person. Specifically, the vibration generation device 50 in the white cane 1 held by the visually impaired person vibrates in a pattern indicating the left deviation warning. As a result, the visually impaired person gripping the grip portion 3 of the white cane 1 recognizes that the left deviation warning has been performed, and changes the walking direction toward the right direction. After performing the deviation warning in this way, the process proceeds to step ST17.

When there is no deviation from the crosswalk CW and "0" is obtained in the state transition function $f_3$, NO is determined in step ST11 and the process proceeds to step ST15. In step ST15, it is determined whether the deviation warning in step ST13 or step ST14 is currently occurring. When the deviation warning is not occurring and NO is determined in step ST15, the process proceeds to step ST17. On the other hand, when the deviation warning is occurring and YES is determined in step ST15, the process proceeds to step ST16 to cancel the deviation warning, and the process proceeds to step ST17.

In step ST17, it is determined whether "1" is obtained in the state transition function $f_2$ (the above expression 11) for determining whether the condition for notifying the crossing completion is satisfied.

When "0" is obtained in this state transition function $f_2$, NO is determined assuming that the condition for notifying the crossing completion is not satisfied, that is, the visually impaired person is crossing the crosswalk CW, and the process returns to step ST10. Since NO is determined in step ST17 until the crossing of the crosswalk CW is completed, the operations of steps ST10 to ST17 are repeated.

That is, the following operation is performed until the crossing of the crosswalk CW is completed: when a deviation from the crosswalk CW occurs while the visually impaired person is crossing, the above-mentioned deviation warning is performed, and when this deviation is resolved, the deviation warning is canceled.

When the visually impaired person completes the crossing of the crosswalk CW and "1" is obtained in the state transition function $f_2$, YES is determined in step ST17, and the process proceeds to step ST18 to perform the notification of the crossing completion to the visually impaired person. Specifically, the vibration generation device 50 in the white cane 1 held by the visually impaired person vibrates in a pattern indicating the crossing completion. As a result, the visually impaired person gripping the grip portion 3 of the white cane 1 recognizes that the notification of the crossing completion has been performed, and returns to the normal walking state.

In this way, the above-described operation is repeated every time the visually impaired person crosses the crosswalk CW.

When the existence of the crosswalk CW is not detected in the determination in step ST2 and NO is determined in step ST2, the process proceeds to step ST19. In step ST19, it is determined whether the state where the existence of the crosswalk CW is not detected continues for a predetermined time. As in the third pattern (FIG. 14) described above, in the state where most of the white lines of the crosswalk CW are covered by the vehicle V, the existence of the crosswalk CW cannot be recognized from the image acquired by the camera 20, and the state where the existence of the crosswalk CW is not detected continues for a predetermined time.

When the state where the existence of the crosswalk CW is not detected has not continued for a predetermined time, NO is determined in step ST19, and the process returns to step ST1. For example, even when the existence of the crosswalk CW is not detected due to the existence of the vehicle V, when the vehicle V then moves and the existence of the crosswalk CW is detected, YES is determined in ST2, and the operations of step ST2 and after described above are performed. On the other hand, when the existence of the crosswalk CW is not detected for a predetermined time and YES is determined in step ST19, the process proceeds to step ST20 to stop the walking support system 10 and to notify the visually impaired person that the walking support system 10 has stopped. Specifically, the vibration generation device 50 in the white cane 1 held by the visually impaired person vibrates in a pattern indicating that the walking support system 10 has stopped. As a result, the visually impaired person gripping the grip portion 3 of the white cane 1 recognizes that the walking support system 10 has stopped by sensing the vibration pattern of the vibration generation device 50.

After the walking support system 10 has stopped in this way, it is determined in step ST21 whether a start switch (not shown) provided in the white cane 1 is turned on. The NO determination is continued in step ST21 until the start switch is turned on. When the start switch is turned on and YES is determined in step ST21, the walking support system 10 is restarted, and the operations from step ST1 described above are repeated.

Effect of Embodiment

As described above, in the present embodiment, when the edge position of the crosswalk CW closer to the pedestrian cannot be detected due to the obstacle (vehicle) V existing on the crosswalk CW, the edge position of the obstacle V closer to the pedestrian in the image acquired by the camera 20 is set as the edge position of the crosswalk CW closer to the pedestrian. As a result, the vibration generation device 50 performs the stop notification to the pedestrian at the time when the pedestrian reaches the position before the edge position of the obstacle V closer to the pedestrian, and even when an obstacle exists on the crosswalk CW, the stop notification can be appropriately performed to the pedestrian.

In particular, when the value obtained by subtracting the obstacle gap distance $h_v$ from the crosswalk gap distance $h_3$ is larger than the preset value, the edge position of the obstacle V closer to the pedestrian in the image acquired by the camera 20 is set as the edge position of the crosswalk CW closer to the pedestrian. In this way, by selecting the edge position to be adopted in performing the stop notification (the edge position of the crosswalk CW closer to the pedestrian or the edge position of the obstacle V closer to the pedestrian) based on the value obtained by subtracting the obstacle gap distance $h_v$ from the crosswalk gap distance $h_3$, the stop notification to the pedestrian can be appropriately performed.

Further, in the present embodiment, when a state where the crosswalk detection unit 82 does not recognize the crosswalk CW continues for a predetermined time, the walking support system 10 is stopped and the information on the stop of the walking support system 10 is transmitted to the vibration generation device 50 via the information transmission unit 86. As a result, it is possible to suppress the malfunction of the walking support system 10 in the situation where the entire crosswalk CW is covered by the obstacle V, and it is also possible to notify the pedestrian that the system has stopped.

Further, in the present embodiment, since the walking support system 10 is realized only with the white cane 1 by incorporating the components of the walking support system 10 into the white cane 1, a highly practical walking support system 10 is provided.

Other Embodiments

It should be noted that the present disclosure is not limited to the above-described embodiment, and all modifications and applications included in the claims and the range equivalent to the claims can be applied.

For example, in the above-described embodiment, a case where the walking support system 10 is built in the white cane 1 used by a visually impaired person has been described. The present disclosure is not limited to this, and the walking support system 10 may be built in a cane, a wheel walker, or the like when the pedestrian is an elderly person.

Further, in the above embodiment, the white cane 1 is provided with the charging socket 70 and the battery (secondary battery) 60 is charged from a household power source. The present disclosure is not limited to this, and a photovoltaic power generation sheet may be attached to the surface of the white cane 1 to charge the battery 60 with the electric power generated by the photovoltaic power generation sheet. Further, a primary battery may be used instead of the secondary battery. Furthermore, the white cane 1 may have a built-in pendulum generator, and the pendulum generator may be used to charge the battery 60.

In the above-described embodiment, the types of notifications are classified according to the vibration pattern of the vibration generation device 50. The present disclosure is not limited to this, and the notifications may be performed by voice.

The present disclosure is applicable to a walking support system that performs a stop notification to a walking visually impaired person before a crosswalk.

What is claimed is:

1. A walking support system that is able to perform a stop notification to a pedestrian before a crosswalk in a situation where the pedestrian approaches the crosswalk, the walking support system comprising:
    an image acquisition unit that acquires an image in front of the pedestrian who is walking;
    a crosswalk detection unit that is able to recognize the crosswalk based on the image acquired by the image acquisition unit and that is able to detect an edge position of the crosswalk closer to the pedestrian;
    a notification unit that performs the stop notification for urging the pedestrian to stop when the pedestrian reaches a position before the edge position of the crosswalk closer to the pedestrian, the edge position having been detected by the crosswalk detection unit; and
    an edge position setting unit that sets an edge position of an obstacle closer to the pedestrian in the image acquired by the image acquisition unit as the edge position of the crosswalk closer to the pedestrian, when the crosswalk detection unit fails to detect the edge position of the crosswalk closer to the pedestrian due to the obstacle existing on the crosswalk.

2. The walking support system according to claim 1, wherein the edge position setting unit sets the edge position of the obstacle closer to the pedestrian in the image as the edge position of the crosswalk closer to the pedestrian when a value obtained by subtracting an obstacle gap distance from a crosswalk gap distance is larger than a preset value, the crosswalk gap distance being a distance between a lower end position of the image acquired by the image acquisition unit and a lower end position of the crosswalk in the image, the crosswalk having been recognized by the image, and the obstacle gap distance being a distance between the lower end position of the image and a lower end position of the obstacle in the image, the obstacle having been recognized by the image.

3. The walking support system according to claim 1, further comprising a system stop unit that stops the walking support system and transmits information on a stop of the walking support system to the notification unit when a state where the crosswalk detection unit does not recognize the crosswalk continues for a predetermined time.

4. The walking support system according to claim 1, wherein the image acquisition unit, the crosswalk detection unit, the notification unit, and the edge position setting unit are built in a white cane used by a visually impaired person.

5. The walking support system according to claim 4, wherein the notification unit is configured to perform a notification to the visually impaired person by vibration or voice.

* * * * *